US012027306B2

(12) United States Patent
Maehara et al.

(10) Patent No.: US 12,027,306 B2
(45) Date of Patent: Jul. 2, 2024

(54) METHOD OF PRODUCING SmFeN-BASED RARE EARTH MAGNET

(71) Applicants: NICHIA CORPORATION, Anan (JP); TOYOTA JIDOSHA KABUSHIKI KAISHA, Toyota (JP)

(72) Inventors: Hisashi Maehara, Itano-gun (JP); Michiya Kume, Anan (JP); Masaaki Ito, Anjo (JP)

(73) Assignees: NICHIA CORPORATION, Anan (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/806,300

(22) Filed: Jun. 10, 2022

(65) Prior Publication Data

US 2022/0399163 A1 Dec. 15, 2022

(30) Foreign Application Priority Data

Jun. 10, 2021 (JP) ................................ 2021-097454
May 31, 2022 (JP) ................................ 2022-088598

(51) Int. Cl.
*H01F 41/02* (2006.01)
*B22F 1/00* (2022.01)
(Continued)

(52) U.S. Cl.
CPC ............ *H01F 41/0266* (2013.01); *B22F 1/05* (2022.01); *B22F 1/09* (2022.01); *B22F 1/102* (2022.01);
(Continued)

(58) Field of Classification Search
CPC .... H01F 41/0266; H01F 41/0273; B22F 1/09; B22F 1/12; B22F 3/16; B22F 3/24;
(Continued)

(56) References Cited

U.S. PATENT DOCUMENTS 4,692,420 A 9/1987 Oda et al.
6,328,817 B1 12/2001 Murakami
(Continued)

FOREIGN PATENT DOCUMENTS

CN 1686886 A 10/2005
JP S5584529 A 6/1980
(Continued)

OTHER PUBLICATIONS

JP-4887617-B2: Espacenet English machine translation (Year: 2012).*
(Continued)

*Primary Examiner* — Adil A. Siddiqui
(74) *Attorney, Agent, or Firm* — Hunton Andrews Kurth LLP

(57) ABSTRACT

A method of producing a SmFeN-based rare earth magnet, the method including: dispersing a SmFeN-based anisotropic magnetic powder comprising Sm, Fe, and N using a resin-coated metal media or a resin-coated ceramic media to obtain a dispersed SmFeN-based anisotropic magnetic powder; mixing the dispersed SmFeN-based anisotropic magnetic powder with a modifier powder to obtain a powder mixture; compacting the powder mixture in a magnetic field to obtain a magnetic field compact; pressure-sintering the magnetic field compact to obtain a sintered compact; and heat treating the sintered compact.

10 Claims, 2 Drawing Sheets

(51) Int. Cl.

| | |
|---|---|
| ***B22F 1/05*** | (2022.01) |
| ***B22F 1/102*** | (2022.01) |
| ***B22F 1/12*** | (2022.01) |
| ***B22F 3/16*** | (2006.01) |
| ***B22F 3/24*** | (2006.01) |
| ***C22C 38/00*** | (2006.01) |
| ***H01F 1/055*** | (2006.01) |
| ***H01F 1/059*** | (2006.01) |

(52) U.S. Cl.
CPC .................. *B22F 1/12* (2022.01); *B22F 3/16* (2013.01); *B22F 3/24* (2013.01); *C22C 38/001* (2013.01); *C22C 38/005* (2013.01); *H01F 1/059* (2013.01); *H01F 41/0273* (2013.01); *B22F 2003/248* (2013.01); *B22F 2301/30* (2013.01); *B22F 2301/355* (2013.01); *B22F 2998/10* (2013.01); *B22F 2999/00* (2013.01); *C22C 2202/02* (2013.01); *H01F 1/0558* (2013.01)

(58) Field of Classification Search
CPC ............ B22F 2003/248; B22F 2301/30; B22F 2301/355; C22C 38/001; C22C 38/005; C22C 2202/02
See application file for complete search history.

(56) References Cited

U.S. PATENT DOCUMENTS

| | | | |
|---|---|---|---|
| 2006/0022175 | A1 | 2/2006 | Komuro et al. |
| 2006/0191601 | A1 | 8/2006 | Komuro et al. |
| 2008/0035879 | A1 | 2/2008 | Matsukawa et al. |
| 2010/0289366 | A1 | 11/2010 | Komuro et al. |
| 2011/0240909 | A1 | 10/2011 | Kanda et al. |
| 2012/0145944 | A1 | 6/2012 | Komuro et al. |
| 2012/0175986 | A1 | 7/2012 | Komuro et al. |
| 2013/0011660 | A1 * | 1/2013 | Diekmann ........ C04B 35/63468 428/407 |
| 2013/0273189 | A1 | 10/2013 | Yamao et al. |
| 2013/0278104 | A1 | 10/2013 | Komuro et al. |
| 2017/0271928 | A1 | 9/2017 | Sanada et al. |
| 2018/0226180 | A1 * | 8/2018 | Kawashita .......... H01F 41/0266 |
| 2020/0016663 | A1 | 1/2020 | Okada et al. |
| 2020/0098496 | A1 * | 3/2020 | Kinoshita ................. B22F 1/16 |
| 2021/0098161 | A1 | 4/2021 | Maehara |

FOREIGN PATENT DOCUMENTS

| | | | |
|---|---|---|---|
| JP | S5584547 | A | 6/1980 |
| JP | S63200848 | A | 8/1988 |
| JP | H02119952 | A | 5/1990 |
| JP | H03174355 | A | 7/1991 |
| JP | H05228386 | A | 9/1993 |
| JP | H05253512 | A | 10/1993 |
| JP | H05294610 | A | 11/1993 |
| JP | H05329394 | A | 12/1993 |
| JP | H0671193 | A | 3/1994 |
| JP | H08116098 | A | 5/1996 |
| JP | H08130142 | A | 5/1996 |
| JP | H10144509 | A | 5/1998 |
| JP | H11323508 | A | 11/1999 |
| JP | 2004031761 | A | 1/2004 |
| JP | 2004071854 | A | 3/2004 |
| JP | 2006066870 | A | 3/2006 |
| JP | 2006238604 | A | 9/2006 |
| JP | 2010267637 | A | 11/2010 |
| JP | 2011077223 | A | 4/2011 |
| JP | 2011211106 | A | 10/2011 |
| JP | 4887617 | B2 * | 2/2012 |
| JP | 2013089813 | A | 5/2013 |
| JP | 2015195326 | A | 11/2015 |
| JP | 2016044352 | A | 4/2016 |
| JP | 2017171949 | A | 9/2017 |
| JP | 2018127716 | A | 8/2018 |
| JP | 2019012796 | A | 1/2019 |
| JP | 6489073 | B2 | 3/2019 |
| JP | 6555197 | B2 | 7/2019 |
| JP | 6614647 | B2 | 11/2019 |
| JP | 6759855 | B2 | 9/2020 |
| JP | 2021055133 | A | 4/2021 |
| JP | 2021077697 | A | 5/2021 |
| WO | 2005096325 | A1 | 10/2005 |
| WO | 2015199096 | A1 | 12/2015 |
| WO | 2021085521 | A1 | 5/2021 |

OTHER PUBLICATIONS

United States Patent and Trademark office, Non-Final office action issued to U.S. Appl. No. 17/935,907 on Feb. 16, 2023, 17 pages.
USPTO, Non-Final Office Action issued to U.S. Appl. No. 17/806,376 on Feb. 13, 2024 (26 pages).
Final Office Action issued in U.S. Appl. No. 17/935,907, dated Jul. 31, 2023, 20 pages.

* cited by examiner

METHOD OF PRODUCING SmFeN-BASED RARE EARTH MAGNET

CROSS-REFERENCE TO RELATED PATENT APPLICATION

This application claims priority to Japanese Patent Application No. 2021-097454 filed on Jun. 10, 2021, and Japanese Patent Application No. 2022-088598 filed on May 31, 2022. The disclosures of Japanese Patent Application No. 2021-097454 and Japanese Patent Application No. 2022-088598 are hereby incorporated by reference in their entirety.

BACKGROUND

The present disclosure relates to a method of producing a SmFeN-based rare earth magnet.

JP 2015-195326 A discloses a production method involving grinding a SmFeN-based anisotropic magnetic powder using ceramic media in a solvent. However, the use of hard ceramic media is considered to cause chipping to form fine particles, so that the ground SmFeN-based anisotropic magnetic powder has a higher oxygen content and lower magnetic properties.

WO 2015/199096 discloses a method of producing a SmFeN-based rare earth magnet, which includes pre-compacting a SmFeN-based anisotropic magnetic powder in a magnetic field of not lower than 6 kOe, followed by warm compaction at a temperature of not higher than 600° C. and a contact pressure of 1 to 5 GPa.

SUMMARY

An exemplary object of the present disclosure is to provide a method of producing a SmFeN-based rare earth magnet having high magnetic properties.

Exemplary embodiments of the present disclosure relate to a method of producing a SmFeN-based rare earth magnet, the method including: dispersing a SmFeN-based anisotropic magnetic powder containing Sm, Fe, and N using a resin-coated metal media or a resin-coated ceramic media to obtain a dispersed SmFeN-based anisotropic magnetic powder; mixing the dispersed SmFeN-based anisotropic magnetic powder with a modifier powder to obtain a powder mixture; compacting the powder mixture in a magnetic field to obtain a magnetic field compact; pressure-sintering the magnetic field compact to obtain a sintered compact; and heat treating the sintered compact.

According to above embodiments, it is possible to provide a method of producing a SmFeN-based rare earth magnet having high magnetic properties.

DETAILED DESCRIPTION

Figure 1:
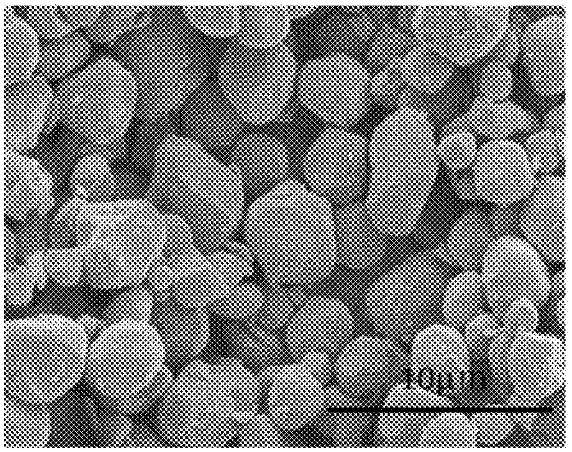
FIG. 1 shows an exemplary SEM image of a SmFeN-based anisotropic magnetic powder in Example 1.

Embodiments of the present disclosure are described in detail below. The following embodiments, however, are intended as examples to embody the technical idea of the present disclosure and are not intended to limit the scope of the present disclosure to the following embodiments. As used herein, the term “step” encompasses not only an independent step but also a step that may not be clearly distinguished from other steps, as long as a desired object of the step is achieved. Moreover, numerical ranges indicated using “to” refer to ranges including the numerical values indicated before and after “to” as the minimum and maximum, respectively.

The method of producing a SmFeN-based rare earth magnet according to the present embodiments includes: dispersing a SmFeN-based anisotropic magnetic powder containing Sm, Fe, and N using a resin-coated metal media or a resin-coated ceramic media to obtain a dispersed SmFeN-based anisotropic magnetic powder; mixing the dispersed SmFeN-based anisotropic magnetic powder with a modifier powder to obtain a powder mixture; compacting the powder mixture in a magnetic field to obtain a magnetic field compact; pressure-sintering the magnetic field compact to obtain a sintered compact; and heat treating the sintered compact.

In the dispersion step according to the present embodiments, a SmFeN-based anisotropic magnetic powder containing Sm, Fe, and N may be dispersed using a resin-coated metal media or a resin-coated ceramic media. Herein, the term “dispersion”, “dispersing”, or “dispersed” means that the aggregated particles in the SmFeN-based anisotropic magnetic powder formed by sintering or magnetic aggregation are separated into single particles or particles consisting of very few particles. According to the present embodiments, since the impact energy of collision between the SmFeN-based anisotropic magnetic powder and the resin-coated metal or ceramic media is smaller than that of collision between the SmFeN-based anisotropic magnetic powder and non-resin coated metal or ceramic media, dispersion is more likely to occur than grinding. If the SmFeN-based anisotropic magnetic powder is ground as in the conventional art, fine particles formed due to chipping will be oxidized and degraded to reduce the magnetic properties of the SmFeN-based anisotropic magnetic powder. It is also considered that when the SmFeN-based anisotropic magnetic powder containing fine particles is used to produce a SmFeN-based rare earth magnet, the fine particles cannot be sufficiently oriented during compaction in a magnetic field, thereby reducing the magnetic properties of the SmFeN-based rare earth magnet. In contrast, when a SmFeN-based anisotropic magnetic powder is dispersed as in the present embodiments, it is considered that since the resulting SmFeN-based anisotropic magnetic powder contains only a few fine particles and aggregated particles, the reduction in the magnetic properties of the SmFeN-based anisotropic magnetic powder caused by oxidation and degradation of the fine particles is reduced; further, sufficient orientation is achieved even during compaction in a magnetic field, so that the SmFeN-based rare earth magnet has higher magnetic properties.

The dispersion apparatus used in the dispersion step may be a vibration mill, for example. The media used in the dispersion apparatus such as the vibration mill may include a metal core and a coating resin coating the metal core. Examples of the material of the metal core include iron, chromium steel, stainless steel, and steel. The media used in the dispersion apparatus such as the vibration mill may include a ceramic core and a coating resin coating the ceramic core. Examples of the material of the ceramic core include inorganic compounds such as oxides, carbides, nitrides, or borides of metals or non-metals, specific examples of which include alumina, silica, zirconia, silicon carbide, silicon nitride, barium titanate, and glass. Iron or chromium steel is preferred among these because they have a high dispersing ability owing to the high specific gravity and less wear owing to the high hardness, and also because the iron-containing wear powder generated by abrasion has a low impact on the SmFeN-based anisotropic magnetic powder. Therefore, it is preferred that a media of a resin-coated iron core or a resin-coated chromium steel core is used in the dispersion apparatus. Examples of the coating resin include thermoplastic resins such as nylon 6, nylon 66, nylon 12, polypropylene, polyphenylene sulfide, and polyethylene, and thermosetting resins such as epoxy resins and silicone resins, and combinations thereof. Thermoplastic resins can be formed by injection molding and the fluidity of thermoplastic resins is higher than the fluidity of thermosetting resins. Therefore, the thickness of a coating resin using a thermoplastic resin can be thinner than that of a coating resin using thermosetting resin. A thermoplastic resin-coated media can have a higher specific gravity and a smaller size than these of a thermosetting resin-coated media. Nylon such as nylon 6, nylon 66, nylon 12 is preferred among thermoplastic resins, because nylon is relatively soft and inexpensive among thermoplastic resins. A media of a nylon-coated iron core may be used in the dispersion apparatus. The SmFeN-based anisotropic magnetic powder can be dispersed while further suppressing the generation of fine particles by using the media of the nylon-coated iron core.

The media used in the dispersion step preferably has a specific gravity of not less than 4, more preferably not less than 5. When the specific gravity is less than 4, the impact energy during dispersion tends to be too small so that dispersion is less likely to occur. The upper limit of the specific gravity is not limited, but is preferably not more than 8, more preferably not more than 7.5. The media used in the dispersion step may have a specific gravity of at least 6 but not more than 7.5. The media may include a core of a metal or a ceramic and a resin film coating the core. The thickness of the resin film may be at least 0.1 μm but not more than 5 mm. It is suitable for dispersing the SmFeN-based anisotropic magnetic powder because an increase in the diameter of the media can be suppressed. Therefore, the residual magnetization $\sigma r$ of the dispersed SmFeN-based anisotropic magnetic powder can be improved.

Although the dispersion step may be performed in the presence of a solvent, it is preferably performed in the absence of a solvent in order to suppress the oxidation of the SmFeN-based anisotropic magnetic powder by the components (e.g., moisture) in the solvent.

To suppress oxidation of the SmFeN-based anisotropic magnetic powder, the dispersion step is preferably performed in an inert gas atmosphere such as nitrogen gas atmosphere or argon gas atmosphere. The concentration of nitrogen in the nitrogen gas atmosphere may be 90% by volume or more, and preferably 95% by volume or more. The concentration of argon in the argon gas atmosphere may be 90% by volume or more, and preferably 95% by volume or more. The inert gas atmosphere may be an atmosphere in which two or more inert gases such as nitrogen gas and argon gas are mixed. The concentration of the inert gas in the inert gas atmosphere may be 90% by volume or more, and preferably 95% by volume or more.

The diameter of the resin-coated metal media or the resin-coated ceramic media is preferably at least 2 mm but not more than 100 mm, more preferably at least 3 mm but not more than 15 mm, still more preferably at least 3 mm but not more than 10 mm. The media having a diameter of less than 2 mm is difficult to be coated with the resin, while the media having a diameter of more than 100 mm is large and thus tends to have less contact with the powder so that dispersion is less likely to occur.

When a vibration mill is used in the dispersion step, for example, the amount of the media may be at least 60% by volume but not more than 70% by volume, and the amount of the SmFeN-based anisotropic magnetic powder may be at least 3% by volume but not more than 20% by volume, preferably at least 5% by volume but not more than 20% by volume, each relative to the volume of the container used to contain the SmFeN-based anisotropic magnetic powder and the media.

Although the SmFeN-based anisotropic magnetic powder used in the dispersion step may be produced with reference to the method disclosed in, for example, JP 2017-117937 A or JP 2021-055188 A, an exemplary method of producing the SmFeN-based anisotropic magnetic powder will be described below.

The SmFeN-based anisotropic magnetic powder used in the dispersion step may be prepared by a production method including: pretreating an oxide containing Sm and Fe by heat treatment in a reducing gas-containing atmosphere to obtain a partial oxide; heat treating the partial oxide in the presence of a reducing agent to obtain alloy particles; nitriding the alloy particles to obtain a nitride; and washing the nitride to obtain a SmFeN-based anisotropic magnetic powder.

Although the oxide containing Sm and Fe used in the pretreatment step may be prepared by mixing a Sm oxide and a Fe oxide, it can be prepared by mixing a solution containing Sm and Fe with a precipitating agent to obtain a precipitate containing Sm and Fe (precipitation step), and calcining the precipitate to obtain an oxide containing Sm and Fe (oxidation step).

Precipitation Step

In the precipitation step, a Sm source and a Fe source may be dissolved in a strongly acidic solution to prepare a solution containing Sm and Fe. When the main phase to be obtained is $Sm_2Fe_{17}N_3$, the molar ratio of Sm and Fe (Sm:Fe) is preferably 1.5:17 to 3.0:17, more preferably 2.0:17 to 2.5:17. To the aforementioned solution may be added La, W, Co, Ti, Sc, Y, Pr, Nd, Pm, Gd, Tb, Dy, Ho, Er, Tm, Lu, or other sources. In view of remanence, the solution preferably contains La. In view of coercive force and squareness ratio, the solution preferably contains W. In view of temperature characteristics, the solution preferably contains Co or Ti.

Any Sm or Fe source soluble in a strongly acidic solution may be used. In view of availability, examples of the Sm source include samarium oxide, and examples of the Fe source include $FeSO_4$. The concentration of the solution containing Sm and Fe may be appropriately adjusted within a range in which the Sm source and the Fe source can be substantially dissolved in an acidic solution. In view of solubility, examples of the acidic solution include sulfuric acid.

The solution containing Sm and Fe may be reacted with a precipitating agent to obtain an insoluble precipitate containing Sm and Fe. Here, the solution containing Sm and Fe is not limited as long as Sm and Fe are present in the solution during the reaction with the precipitating agent. For example, a Sm source and a Fe source may be prepared as separate solutions and individually added dropwise to react with the precipitating agent. When separate solutions are prepared, the concentration of each solution may also be appropriately adjusted within a range in which the corresponding source can be substantially dissolved in an acidic solution. The precipitating agent may be any alkaline solution that reacts with a solution containing Sm and Fe to give a precipitate. Examples include ammonia water and caustic soda, with caustic soda being preferred.

In order to easily control the particle properties of the precipitate, the precipitation reaction is preferably performed by adding dropwise the solution containing Sm and Fe and the precipitating agent each to a solvent such as water. A precipitate having a homogeneous element distribution, a narrow particle size distribution, and a uniform particle shape can be obtained by appropriately controlling the feeding rates of the solution containing Sm and Fe and the precipitating agent, the reaction temperature, the concentration of the reaction solution, the pH during the reaction, and other conditions. The use of such a precipitate improves the magnetic properties of the finally produced SmFeN-based anisotropic magnetic powder. The reaction temperature is preferably at least 0° C. but not higher than 50° C., more preferably at least 35° C. but not higher than 45° C. The concentration of the reaction solution calculated as the total concentration of metal ions is preferably at least 0.65 mol/L but not more than 0.85 mol/L, more preferably at least 0.7 mol/L but not more than 0.85 mol/L. The reaction pH is preferably at least 5 but not more than 9, more preferably at least 6.5 but not more than 8.

In view of magnetic properties, the solution containing Sm and Fe preferably further contains at least one metal selected from the group consisting of La, W, Co, and Ti. For example, in view of remanence, the solution preferably contains La. In view of coercive force and squareness ratio, the solution preferably contains W. In view of temperature characteristics, the solution preferably contains Co or Ti. The La source is not limited as long as it is soluble in a strongly acidic solution. In view of availability, examples include $La_2O_3$ and $LaCl_3$. The concentration may be appropriately adjusted within a range in which the Sm and Fe sources and the La, W, Co, and/or Ti source can be substantially dissolved in an acidic solution. In view of solubility, examples of the acidic solution include sulfuric acid. The W source may be ammonium tungstate, the Co source may be cobalt sulfate, and the Ti source may be sulfated titania.

When the solution containing Sm and Fe further contains at least one metal selected from the group consisting of La, W, Co, and Ti, an insoluble precipitate containing Sm, Fe, and at least one selected from the group consisting of La, W, Co, and Ti will be produced. Here, the solution is not limited as long as at least one selected from the group consisting of La, W, Co, and Ti is present in the solution during the reaction with the precipitating agent. For example, the sources may be prepared as separate solutions and individually added dropwise to react with the precipitating agent. Alternatively, they may be prepared into the same solution containing Sm and Fe.

The powder obtained in the precipitation step roughly determines the powder particle size, particle shape, and particle size distribution of the finally produced SmFeN-based anisotropic magnetic powder. When the particle size of the obtained powder is measured with a laser diffraction-type wet particle size distribution analyzer, the size and distribution of all the powder preferably substantially fall within the range of at least 0.05 μm but not more than 20 μm, preferably at least 0.1 μm but not more than 10 μm.

After separating the precipitate, the separated precipitate is preferably subjected to solvent removal in order to reduce aggregation of the precipitate caused by evaporation of the residual solvent in which the precipitate has been re-dissolved during the heat treatment in the subsequent oxidation step, and to reduce changes in properties such as particle size distribution and powder particle size. Specifically, when the solvent used is water, for example, the solvent removal may be performed by drying in an oven at at least 70° C. but not higher than 200° C. for at least 5 hours but not longer than 12 hours.

The precipitation step may be followed by washing and separating the resulting precipitate. The step of washing may be appropriately performed until the conductivity of the supernatant solution reaches 5 $mS/m^2$ or lower. The step of separating the precipitate may be performed, for example, by mixing the resulting precipitate with a solvent (preferably water), followed by filtration, decantation, or other separation methods.

Oxidation Step

The oxidation step includes calcining the precipitate formed in the precipitation step to obtain an oxide containing Sm and Fe. For example, the precipitate may be converted into an oxide by heat treatment. The heat treatment of the precipitate needs to be performed in the presence of oxygen, for example in an air atmosphere. Moreover, since the presence of oxygen is necessary, the non-metal portions of the precipitate preferably contain oxygen atoms.

The heat treatment temperature in the oxidation step (hereinafter, oxidation temperature) is not limited, but is preferably at least 700° C. but not higher than 1,300° C., more preferably at least 900° C. but not higher than 1,200° C. When the temperature is lower than 700° C., the oxidation tends to be insufficient. When the temperature is higher than 1,300° C., the resulting SmFeN-based anisotropic magnetic powder tends not to have the target particle shape, average particle size, and particle size distribution. The heat treatment duration is not limited either, but is preferably at least 1 hour but not longer than 3 hours.

The thus formed oxide is oxide particles in which Sm and Fe have been sufficiently microscopically mixed, and the particle shape, particle size distribution, and other properties of the precipitate have been reflected.

Pretreatment Step

The pretreatment step includes subjecting the oxide containing Sm and Fe to heat treatment in a reducing gas-containing atmosphere to obtain a partial oxide which is a partially reduced product of the oxide.

Here, the term "partial oxide" refers to a partially reduced oxide. The oxygen concentration of the partial oxide is not limited, but is preferably not more than 10% by mass, more preferably not more than 8% by mass. When the concentration is more than 10% by mass, the heat generated by reduction with Ca in the reduction step tends to increase, raising the calcination temperature enough to form abnormally grown particles. Here, the oxygen concentration of the partial oxide can be measured by a non-dispersive infrared spectroscopy (ND-IR).

The reducing gas may be appropriately selected from, for example, hydrogen ($H_2$), carbon monoxide (CO), hydrocarbon gases such as methane ($CH_4$), and combinations thereof. Hydrogen gas is preferred in terms of cost. The flow rate of the gas may be appropriately adjusted within a range that does not cause scattering of the oxide. The heat treatment temperature in the pretreatment step (hereinafter, pretreatment temperature) is preferably at least 300° C. but not higher than 950° C. The lower limit is more preferably at least 400° C., still more preferably at least 750° C. The upper limit is more preferably lower than 900° C. When the pretreatment temperature is at least 300° C., the oxide containing Sm and Fe can be efficiently reduced. When the pretreatment temperature is not higher than 950° C., the grain growth and segregation of the oxide particles can be inhibited so that the desired particle size can be maintained. The heat treatment duration is not limited, but may be at least 1 hour but not longer than 50 hours. Moreover, when the reducing gas used is hydrogen, preferably the thickness of the oxide layer used is adjusted to not more than 20 mm, and further the dew point in the reaction furnace is adjusted to not higher than −10° C.

Reduction Step

The reduction step includes heat treating the partial oxide in the presence of a reducing agent to obtain alloy particles. For example, the reduction may be performed by contacting the partial oxide with molten calcium or calcium vapor. In view of magnetic properties, the heat treatment temperature is preferably at least 920° C. but not higher than 1,200° C., more preferably at least 950° C. but not higher than 1,150° C., still more preferably at least 980° C. but not higher than 1,100° C.

As an alternative to the above-mentioned heat treatment process in the reduction step, heat treatment may be performed at a first temperature of at least 1,000° C. but not higher than 1,090° C., and then at a second temperature lower than the first temperature of at least 980° C. but not higher than 1,070° C. The first temperature is preferably at least 1,010° C. but not higher than 1,080° C., and the second temperature is preferably at least 990° C. but not higher than 1,060° C. With regard to the difference between the first temperature and the second temperature, the second temperature is preferably lower than the first temperature by at least 15° C. but not more than 60° C., more preferably by at least 15° C. but not more than 30° C. The heat treatment at the first temperature and the heat treatment at the second temperature may be continuously performed. Although there may be a heat treatment at a temperature lower than the second temperature between these heat treatments, it is preferred in view of productivity to perform these treatments continuously. To perform a more uniform reduction reaction, the duration of each heat treatment is preferably shorter than 120 minutes, more preferably shorter than 90 minutes. The lower limit of the heat treatment duration is preferably not shorter than 10 minutes, more preferably not shorter than 30 minutes.

The metallic calcium serving as a reducing agent may be used in the form of granules or powder, and its average particle size is preferably 10 mm or less in order to more effectively reduce aggregation during the reduction reaction. Moreover, the metallic calcium is preferably added in an amount that is 1.1 to 3.0 times, more preferably 1.5 to 2.5 times the reaction equivalent (which is the stoichiometric amount needed to reduce the rare earth oxides, but includes the amount needed to reduce oxides of the Fe component, if present).

In the reduction step, the metallic calcium as a reducing agent may be used in combination with a disintegration accelerator, if necessary. The disintegration accelerator may be appropriately used to facilitate the disintegration or granulation of the product during the post treatment step described later. Examples include alkaline earth metal salts such as calcium chloride, and alkaline earth oxides such as calcium oxide. Such a disintegration accelerator may be used in an amount of at least 1% by mass but not more than 30% by mass, preferably at least 5% by mass but not more than 30% by mass, relative to the amount of the samarium oxide.

Nitridation Step

The nitridation step includes nitriding the alloy particles obtained in the reduction step to obtain anisotropic magnetic particles. Since the particulate precipitate obtained in the precipitation step is used, the alloy particles obtained in the reduction step are in porous bulk form. This permits the alloy particles to be directly nitrided by heat treatment in a nitrogen atmosphere without grinding, resulting in uniform nitridation.

The heat treatment temperature in the nitridation of the alloy particles (hereinafter, nitridation temperature) is preferably adjusted at 300 to 610° C., particularly preferably 400 to 550° C., and the atmosphere may be replaced with nitrogen to perform the heat treatment in this temperature range. The heat treatment duration may be set so that the alloy particles can be sufficiently uniformly nitrided.

With regard to the heat treatment temperature in the nitridation of the alloy particles, heat treatment may be performed at a first temperature of at least 400° C. but not higher than 470° C. and then at a second temperature of at least 480° C. but not higher than 610° C. for nitridation. If the alloy particles are heat treated at the high second temperature without being nitrided at the first temperature, the nitridation may rapidly proceed to cause abnormal heat generation which can degrade the SmFeN-based anisotropic magnetic powder, greatly reducing the magnetic properties. Moreover, the nitridation step is preferably performed in a substantially nitrogen atmosphere in order to allow the nitridation to proceed more slowly.

Here, the term "substantially" is used in consideration of the potential presence of unavoidable element(s) other than nitrogen due to contamination of impurities or other factors. For example, the nitrogen content of the atmosphere is not lower than 95%, preferably not lower than 97%, more preferably not lower than 99%.

The first temperature in the nitridation step is preferably at least 400° C. but not higher than 470° C., more preferably at least 410° C. but not higher than 450° C. When the first temperature is lower than 400° C., the nitridation tends to proceed very slowly. When the first temperature is higher than 470° C., excessive nitridation or degradation tends to easily occur due to heat generation. The heat treatment duration at the first temperature is not limited, but is preferably at least 1 hour but not longer than 40 hours, more preferably not longer than 20 hours. When the duration is shorter than 1 hour, the nitridation may insufficiently proceed. When the duration is longer than 40 hours, productivity is impaired.

The second temperature is preferably at least 480° C. but not higher than 610° C., more preferably at least 500° C. but not higher than 550° C. When the second temperature is lower than 480° C., the nitridation of large particles may insufficiently proceed. When the second temperature is higher than 610° C., excessive nitridation or degradation can easily occur. The heat treatment duration at the second temperature is preferably at least 15 minutes but not longer than 5 hours, more preferably at least 30 minutes but not longer than 2 hours. When the duration is shorter than 15 minutes, the nitridation may insufficiently proceed. When the duration is longer than 5 hours, productivity is impaired.

The heat treatment at the first temperature and the heat treatment at the second temperature may be continuously performed. Although there may be a heat treatment at a temperature lower than the second temperature between these heat treatments, it is preferred in view of productivity to perform these treatments continuously.

Post Treatment Step

In some cases, the product obtained after the nitridation step contains, in addition to the magnetic particles, contaminants such as by-product CaO and unreacted metallic calcium, and forms a composite with these contaminants in sintered bulk form. Such a product obtained after the nitridation step may be introduced into cold water to separate the CaO and metallic calcium as a suspension of calcium hydroxide ($Ca(OH)_2$) from the SmFeN-based anisotropic magnetic powder. Further, the residual calcium hydroxide may be sufficiently removed by washing the SmFeN-based anisotropic magnetic powder with acetic acid or the like. When the product is introduced into water, oxidation of metallic calcium by water and hydration of by-product CaO will occur, causing disintegration or micronization of the reaction product that is a composite in sintered bulk form.

Alkali Treatment Step

The product obtained after the nitridation step may be introduced into an alkali solution. Examples of the alkali solution used in the alkali treatment step include an aqueous calcium hydroxide solution, an aqueous sodium hydroxide solution, and an aqueous ammonia solution. In view of waste water treatment and high pH, an aqueous calcium hydroxide solution or an aqueous sodium hydroxide solution is preferred among these. In the alkali treatment of the product obtained after the nitridation step, the remaining Sm-rich layer containing a certain amount of oxygen serves as a protection layer, thereby reducing an increase in oxygen concentration caused by the alkali treatment.

The pH of the alkali solution used in the alkali treatment step is not limited, but is preferably not less than 9, more preferably not less than 10. When the pH is less than 9, the rate of the reaction into calcium hydroxide is high, causing more heat generation. Thus, the finally produced SmFeN-based anisotropic magnetic powder tends to have a higher oxygen concentration.

In the alkali treatment step, the SmFeN-based anisotropic magnetic powder obtained after the treatment with an alkali solution may optionally be subjected to decantation or other techniques to remove the moisture.

Acid Treatment Step

The alkali treatment step may further be followed by treatment with an acid. In the acid treatment step, the aforementioned Sm-rich layer may be at least partially removed to reduce the oxygen concentration of the magnetic powder as a whole. Moreover, since the production method according to embodiments of the present disclosure does not include grinding or the like, the SmFeN-based anisotropic magnetic powder has a small average particle size and a narrow particle size distribution, and also does not contain fine particles formed by grinding or the like, which makes it possible to reduce an increase in oxygen concentration.

Any acid may be used in the acid treatment step. Examples include hydrogen chloride, nitric acid, sulfuric acid, and acetic acid. To avoid residual impurities, hydrogen chloride or nitric acid is preferred among these.

The amount of the acid used in the acid treatment step per 100 parts by mass of the SmFeN-based anisotropic magnetic powder is preferably at least 3.5 parts by mass but not more than 13.5 parts by mass, more preferably at least 4 parts by mass but not more than 10 parts by mass. When the amount is less than 3.5 parts by mass, the oxide tends to remain on the surface of the SmFeN-based anisotropic magnetic powder, resulting in a higher oxygen concentration. When the amount is more than 13.5 parts by mass, reoxidation is more likely to occur upon exposure to the air, and the cost also tends to increase because the acid dissolves the SmFeN-based anisotropic magnetic powder. When the amount of the acid is at least 3.5 parts by mass but not more than 13.5 parts by mass per 100 parts by mass of the SmFeN-based anisotropic magnetic powder, the surface of the SmFeN-based anisotropic magnetic powder can be coated with a Sm-rich layer which is oxidized enough to inhibit reoxidation upon exposure to the air after the acid treatment. Thus, the resulting SmFeN-based anisotropic magnetic powder has a low oxygen concentration, a small average particle size, and a narrow particle size distribution.

In the acid treatment step, the SmFeN-based anisotropic magnetic powder obtained after the treatment with an acid may optionally be subjected to decantation or other techniques to reduce the moisture.

Dehydration Step

The acid treatment step is preferably followed by dehydration. The dehydration can reduce the moisture in the solids before vacuum drying, thereby inhibiting the progress of oxidation during drying caused due to the higher moisture content of the solids before vacuum drying. Here, the term "dehydration" refers to a treatment in which a pressure or a centrifugal force is applied to reduce the moisture content of the solids after the treatment as compared to that of the solids before the treatment, and excludes mere decantation, filtration, or drying. The dehydration may be performed by any method such as squeezing or centrifugation.

The moisture content of the SmFeN-based anisotropic magnetic powder after the dehydration is not limited, but in order to inhibit the progress of oxidation, it is preferably not higher than 13% by mass, more preferably not higher than 10% by mass.

The SmFeN-based anisotropic magnetic powder obtained by acid treatment or the SmFeN-based anisotropic magnetic powder obtained by acid treatment followed by dehydration is preferably dried in vacuum. The drying temperature is not limited, but is preferably not lower than 70° C., more preferably not lower than 75° C. The drying duration is not limited either, but is preferably not shorter than 1 hour, more preferably not shorter than 3 hours.

Modifier Powder Mixing Step

In the mixing step, the dispersed SmFeN-based anisotropic magnetic powder may be mixed with a modifier powder to obtain a powder mixture. The modifier powder may comprise zinc, a zinc alloy, or a combination thereof. For example, the modifier powder may comprise or consist of a zinc powder, a zinc alloy powder, or a combination thereof. In view of residual magnetization, the upper limit of the amount of the modifier powder relative to the amount of the dispersed SmFeN-based anisotropic magnetic powder is, for example, preferably not more than 15% by mass, more preferably not more than 10% by mass, still more preferably not more than 7% by mass. The lower limit of the amount of the modifier powder relative to the amount of the dispersed SmFeN-based anisotropic magnetic powder may be not less than 1% by mass, for example.

When a zinc alloy is represented by Zn-$M^2$, $M^2$ may be selected from elements which can be alloyed with Zn (zinc) to lower the melting onset temperature of the zinc alloy below the melting point of Zn, and unavoidable impurity elements. In this case, enhanced sinterability is obtained in the pressure-sintering step described later. Examples of $M^2$ capable of lowering the melting point below that of Zn include elements capable of forming $M^2$-Zn eutectic alloys. Typical examples of such $M^2$ elements include Sn, Mg, and Al, and combinations thereof, where Sn represents tin, Mg represents magnesium, and Al represents aluminum. $M^2$ may also be selected from elements which do not inhibit the melting point-lowering function of these elements and the properties of the product. Moreover, the term "unavoidable impurity elements" refers to impurity elements which are inevitably contained, such as impurities contained in the raw materials of the modifier powder or the avoidance of which leads to a significant increase in production cost.

In the zinc alloy represented by Zn-$M^2$, the ratio (molar ratio) between Zn and $M^2$ may be appropriately set to provide an appropriate sintering temperature. For example, the ratio (molar ratio) of $M^2$ to the total zinc alloy may be not lower than 0.05, not lower than 0.10, or not lower than 0.20, but may be not higher than 0.90, not higher than 0.80, not higher than 0.70, not higher than 0.60, not higher than 0.50, not higher than 0.40, or not higher than 0.30.

The particle size (median size) D50 of the modifier powder is not limited, and may be not less than 0.1 μm, not less than 0.5 μm, not less than 1 μm, or not less than 2 μm, but may be not more than 12 μm, not more than 11 μm, not more than 10 μm, not more than 9 μm, not more than 8 μm, not more than 7 μm, not more than 6 μm, not more than 5 μm, or not more than 4 μm. The particle size (median size) D50 is measured by a dry laser diffraction/scattering method, for example.

The modifier powder having a low oxygen content can absorb much oxygen from the SmFeN powder and is therefore preferred. From this point of view, the oxygen content of the modifier powder is preferably not more than 5.0% by mass, more preferably not more than 3.0% by mass, still more preferably not more than 1.0% by mass of the total modifier powder. However, extremely reducing the oxygen content of the modifier powder leads to an increase in production cost. From this point of view, the oxygen content of the modifier powder may be not less than 0.1% by mass, not less than 0.2% by mass, or not less than 0.3% by mass of the total modifier powder.

The mixing with the modifier powder may be performed by any method, such as using a mortar, a muller wheel mixer, an agitator mixer, a mechano-fusion system, a V-mixer, or a ball mill. These methods may be combined. The term "V-mixer" refers to an apparatus equipped with two cylindrical vessels connected in a V shape in which the vessels may be rotated to repeatedly gather and separate the powder particles in the vessels by gravity and centrifugal force, thereby mixing them.

Magnetic Field Compaction Step

In the magnetic field compaction step, the powder mixture may be compacted in a magnetic field to obtain a magnetic field compact. The magnetic field orientation imparts orientation to the magnetic field compact and thus imparts anisotropy to the SmFeN-based rare earth magnet to enhance the residual magnetization. The magnetic field compaction may be performed by known methods, such as compacting the powder mixture using a compacting die and a magnetic field generator located around the die. The compacting pressure may be not less than 10 MPa, not less than 20 MPa, not less than 30 MPa, not less than 50 MPa, not less than 100 MPa, or not less than 150 MPa, but may be not more than 1,500 MPa, not more than 1,000 MPa, or not more than 500 MPa. The magnitude of the magnetic field to be applied may be not less than 500 kA/m, not less than 1,000 kA/m, not less than 1,500 kA/m, or not less than 1,600 kA/m, but may be not more than 20,000 kA/m, not more than 15,000 kA/m, not more than 10,000 kA/m, not more than 5,000 kA/m, not more than 3,000 kA/m, or not more than 2,000 kA/m. The application of a magnetic field may be performed, for example, by applying a static magnetic field using an electromagnet or by applying an alternating pulsed magnetic field.

Pressure Sintering Step

In the pressure sintering step, the magnetic field compact may be pressure-sintered to obtain a sintered compact. The pressure sintering may be performed by any method, such as by providing a die having a cavity and a punch capable of sliding within the cavity, inserting the magnetic field compact into the cavity, and sintering the magnetic field compact while applying a pressure to the magnetic field compact using the punch. The pressure sintering conditions may be appropriately selected so as to be able to sinter the magnetic field compact while applying a pressure to the magnetic field compact (hereinafter, also referred to as "pressure-sinter"). When the sintering temperature is not lower than 300° C., the Fe on the surface of the SmFeN-based anisotropic magnetic powder and the modifier powder (for example, metallic zinc) can be slightly interdiffused in the magnetic field compact, thereby contributing to sintering. For example, the sintering temperature may be not lower than 310° C., not lower than 320° C., not lower than 340° C., or not lower than 350° C. Moreover, when the sintering temperature is not higher than 400° C., the Fe on the surface of the SmFeN-based anisotropic magnetic powder and the modifier powder will not be excessively interdiffused, thus avoiding difficulties in the heat treatment step described later and adverse effects on the magnetic properties of the sintered compact. From these viewpoints, the sintering temperature may be not higher than 400° C., not higher than 390° C., not higher than 380° C., or not higher than 370° C.

The sintering pressure may be appropriately selected from those which can increase the density of the sintered compact. The sintering pressure may typically be not less than 100 MPa, not less than 200 MPa, not less than 400 MPa, not less than 600 MPa, not less than 800 MPa, or not less than 1,000 MPa, but may be not more than 2,000 MPa, not more than 1,800 MPa, not more than 1,600 MPa, not more than 1,500 MPa, not more than 1,300 MPa, or not more than 1,200 MPa.

The sintering duration may be appropriately set so that the Fe on the surface of the SmFeN-based anisotropic magnetic powder and the modifier powder metallic zinc can be slightly interdiffused. Here, the sintering duration excludes the time required to increase the temperature to the heat treatment temperature. For example, the sintering duration may be not shorter than 1 minute, not shorter than 2 minutes, or not shorter than 3 minutes, but may be not longer than 30 minutes, not longer than 20 minutes, not longer than 10 minutes, or not longer than 5 minutes.

Once the sintering duration has elapsed, the sintered compact may be cooled to terminate the sintering. A faster cooling rate can more suppress oxidation or other reaction of the sintered compact. For example, the cooling rate may be at least 0.5° C./sec but not more than 200° C./sec. The sintering atmosphere is preferably an inert gas atmosphere in order to suppress oxidation of the magnetic field compact and the sintered compact. Examples of the inert gas atmosphere include a nitrogen gas atmosphere.

Heat Treatment Step

In the heat treatment step, the sintered compact may be heat treated. The heat treatment forms a Fe—Zn alloy phase as a coating on the surface of the particles of the SmFeN-based anisotropic magnetic powder to further strongly bind (hereinafter, also referred to as "solidify") the particles of the SmFeN-based anisotropic magnetic powder to the particles of the modifier powder, and simultaneously to promote modification. At a heat treatment temperature of not lower than 350° C., the Fe—Zn alloy phase can be appropriately formed on almost all the particles, thereby solidifying and modifying them. The heat treatment temperature may be not lower than 360° C., not lower than 370° C., or not lower than 380° C.

The magnetic phase of the SmFeN-based anisotropic magnetic powder has a $Th_2Zn_{17}$ type and/or $Th_2Ni_{17}$ type crystalline structure, and the formation of the Fe—Zn alloy phase saturates when the heat treatment duration reaches 40 hours. In view of economic efficiency (reduction in time), the heat treatment duration is preferably not longer than 40 hours, not longer than 35 hours, not longer than 30 hours, not longer than 25 hours, or not longer than 24 hours. To suppress oxidation of the sintered compact, the sintered compact is preferably heat treated in vacuum or in an inert gas atmosphere. Here, examples of the inert gas atmosphere include a nitrogen gas atmosphere. The sintered compact may be heat treated in the die used in the pressure sintering, but no pressure is applied to the sintered compact during the heat treatment. In this case, as long as the above-mentioned heat treatment conditions are satisfied, normal magnetic phase and Fe—Zn alloy phase can be appropriately formed, without excessive interdiffusion between Fe and Zn.

The SmFeN-based anisotropic magnetic powder according to embodiments of the present disclosure contains Sm, Fe, and N and has an average particle size of at least 2.5 μm but not more than 5 μm, a residual magnetization σr of not less than 150 emu/g, and an oxygen content of not higher than 0.4% by mass.

The average particle size of the SmFeN-based anisotropic magnetic powder is at least 2.5 μm but not more than 5 μm, preferably at least 2.6 μm but not more than 4.5 μm. The SmFeN-based anisotropic magnetic powder having an average particle size of less than 2.5 μm has a large surface area and is thus more likely to be oxidized. The SmFeN-based anisotropic magnetic powder having an average particle size of more than 5 μm tends to have a multidomain structure, resulting in lower magnetic properties. Here, the term "average particle size" refers to the particle size measured using a laser diffraction particle size distribution analyzer under dry conditions.

The particle size D10 of the SmFeN-based anisotropic magnetic powder is preferably at least 0.5 μm but not more than 3 μm, more preferably at least 1 μm but not more than 2 μm. When the D10 is less than 0.5 μm, the amount of the SmFeN-based anisotropic magnetic powder filled in the magnet tends to decrease, resulting in lower magnetization, while when the D10 is more than 3 μm, the coercive force of the magnet tends to decrease. Here, the term "D10" refers to the particle size corresponding to the 10th percentile of the cumulative particle size distribution by volume of the SmFeN-based anisotropic magnetic powder.

The particle size D50 of the SmFeN-based anisotropic magnetic powder is preferably at least 2 μm but not more than 5 μm, more preferably at least 2.5 μm but not more than 4.5 μm. When the D50 is less than 2 μm, the amount of the SmFeN-based anisotropic magnetic powder filled in the magnet tends to decrease, resulting in lower magnetization. When the D50 is more than 5 μm, the coercive force of the magnet tends to decrease. Here, the term "D50" refers to the particle size corresponding to the 50th percentile of the cumulative particle size distribution by volume of the SmFeN-based anisotropic magnetic powder.

The particle size D90 of the SmFeN-based anisotropic magnetic powder is preferably at least 3 μm but not more than 7 μm, more preferably at least 4.5 μm but not more than 6.5 μm. When the D90 is less than 3 μm, the amount of the SmFeN-based anisotropic magnetic powder filled in the magnet tends to decrease, resulting in lower magnetization. When the D90 is more than 7 μm, the coercive force of the magnet tends to decrease. Here, the term "D90" refers to the particle size corresponding to the 90th percentile of the cumulative particle size distribution by volume of the SmFeN-based anisotropic magnetic powder.

The residual magnetization σr is not less than 150 emu/g, preferably not less than 151 emu/g.

The oxygen content of the SmFeN-based anisotropic magnetic powder is not higher than 0.4% by mass, preferably not higher than 0.38% by mass, more preferably not higher than 0.3% by mass, particularly preferably not higher than 0.25% by mass. When the oxygen content is more than 0.4% by mass, a lot of oxygen can be present on the particle surface, causing the formation of α-Fe. Here, the oxygen content is analyzed after the SmFeN-based anisotropic magnetic powder obtained after completion of all the steps is allowed to stand in the air for at least 30 minutes.

The SmFeN-based anisotropic magnetic powder according to the present embodiments is typically represented by the following formula:

$$Sm_vFe_{(100-v-w-x-y-z-u)}N_wLa_xW_yCO_zTi_u$$

wherein $3 \leq v \leq 30$, $5 \leq w \leq 15$, $0 \leq x \leq 0.3$, $0 \leq y \leq 2.5$, $0 \leq z \leq 2.5$, and $0 \leq u \leq 2.5$.

In the formula, v is defined to be at least 3 but not more than 30 for the following reason. If v is less than 3, the unreacted iron component (α-Fe phase) may be separated, which reduces the coercive force of the SmFeN-based anisotropic magnetic powder so as to fail to provide a practical magnet, while if v is more than 30, the Sm element may precipitate and make the SmFeN-based anisotropic magnetic powder unstable in the air, thereby reducing the remanence. Moreover, w is defined to be at least 5 but not more than 15 for the following reason. If w is less than 5, almost no coercive force may be obtained, while if w is more than 15, a nitride of Sm or iron itself may be formed.

In view of remanence, the amount of La, if present, is preferably at least 0.1% by mass but not more than 5% by mass, more preferably at least 0.15% by mass but not more than 1% by mass.

In view of coercive force and squareness ratio, the amount of W, if present, is preferably at least 0.1% by mass but not more than 5% by mass, more preferably at least 0.15% by mass but not more than 1% by mass.

In view of temperature characteristics, the amount of Co, if present, is preferably at least 0.1% by mass but not more than 5% by mass, more preferably at least 0.15% by mass but not more than 1% by mass.

In view of temperature characteristics, the amount of Ti, if present, is preferably at least 0.1% by mass but not more than 5% by mass, more preferably at least 0.15% by mass but not more than 1% by mass.

The amount of N is preferably at least 3.3% by mass but not more than 3.5% by mass. When the amount is more than 3.5% by mass, excessive nitridation may occur. When the amount is less than 3.3% by mass, insufficient nitridation may occur. In both cases, the magnetic properties tend to decrease.

In particular, SmFeN, SmFeLaN, SmFeLaWN, or SmFeLaCoN is preferred.

The SmFeN-based anisotropic magnetic powder may have a below-defined span of not more than 1.6, preferably not more than 1.3.

$$Span=(D90-D10)/D50$$

In the formula, D10, D50, and D90 represent the particle sizes corresponding to the 10th percentile, 50th percentile, and 90th percentile, respectively, of the cumulative particle size distribution by volume. When the span is more than 1.6, large particles are present, so that the magnetic properties tend to decrease.

The average circularity of the SmFeN-based anisotropic magnetic powder is preferably not less than 0.50, more preferably not less than 0.70, particularly preferably not less than 0.75. When the circularity is less than 0.50, the fluidity may deteriorate so that stress can occur between the particles during the magnetic field compaction, resulting in lower magnetic properties. The circularity may be determined using a scanning electron microscope (SEM) and a particle analysis Ver. 3 available from Sumitomo Metal Technology, Inc. as image analysis software. The circularity may be determined by taking a SEM image at a magnification of 3,000, processing the image for binarization, and calculating the circularity of each particle. The term "circularity" defined in the present disclosure refers to the average of the circularities obtained by measuring about 1,000 to 10,000 particles. In general, the larger the number of small size particles, the higher the circularity. Hence, particles having a particle size of not less than 1 μm are measured for circularity. The circularity measurement uses the definitional equation: Circularity=4 $\pi S/L^2$, wherein S represents the area of the two-dimensional projection of the particle, and L represents the perimeter of the two-dimensional projection thereof.

The SmFeN-based rare earth magnet of the present embodiments contains Sm, Fe, and N and has a residual magnetization of not less than 0.97 T. The residual magnetization is preferably not less than 1 T. The coercive force may be not less than 2,200 kA/m, preferably not less than 2,300 kA/m.

EXAMPLES

Examples are described below. It should be noted that "%" is by mass unless otherwise specified.

Evaluation

The metal contents, average particle size, particle size distribution, nitrogen content, oxygen content, and residual magnetization σr of the SmFeN-based anisotropic magnetic powder were evaluated as described below.

Metal Contents

The amounts of the metals (Sm, Fe, La, W, etc.) in the SmFeN-based anisotropic magnetic powder dissolved with hydrochloric acid were measured by ICP-AES (apparatus name: Optima 8300).

Average Particle Size and Particle Size Distribution

The average particle size and particle size distribution of the SmFeN-based anisotropic magnetic powder were measured with a laser diffraction particle size distribution analyzer (HELOS & RODOS available from Japan Laser Corporation).

Nitrogen Content and Oxygen Content

The nitrogen content and oxygen content of the SmFeN-based anisotropic magnetic powder were measured by a heat conductivity method (EMGA-820 available from Horiba Ltd.).

Residual Magnetization σr, Coercive Force iHc, and Squareness Ratio Hk

The prepared SmFeN-based anisotropic magnetic powder was packed together with a paraffin wax into a sample vessel. After the paraffin wax was melted using a dryer, the easy axes of magnetization were aligned in an orientation field of 16 kA/m. The magnetically oriented sample was pulse magnetized in a magnetizing field of 32 kA/m, and the residual magnetization σr, coercive force iHc, and squareness ratio Hk of the sample were measured using a vibrating sample magnetometer (VSM) with a maximum field of 16 kA/m.

Production Example 1

Precipitation Step

An amount of 5.0 kg of $FeSO_4.7H_2O$ was mixed and dissolved in 2.0 kg of pure water. To the mixture were further added 0.49 kg of $Sm_2O_3$, 0.035 kg of $La_2O_3$, and 0.74 kg of 70% sulfuric acid, and they were well stirred and completely dissolved. Next, pure water was added to the resulting solution so that the final Fe and Sm concentrations were adjusted to 0.726 mol/L and 0.112 mol/L, respectively, to obtain a SmFeLa sulfuric acid solution.

The entire amount of the prepared SmFeLa sulfuric acid solution was added dropwise to 20 kg of pure water kept at a temperature of 40° C. with stirring over 70 minutes from the start of the reaction, while simultaneously adding dropwise a 15% ammonia solution to adjust the pH to 7 to 8. Thus, a slurry containing a SmFeLa hydroxide was obtained. The slurry was washed with pure water by decantation, followed by solid-liquid separation to separate the hydroxide. The separated hydroxide was dried in an oven at 100° C. for 10 hours.

Oxidation Step

The hydroxide obtained in the precipitation step was calcined in the air at 1,000° C. for 1 hour. After cooling, a red SmFeLa oxide as raw material powder was obtained.

Pretreatment Step

An amount of 100 g of the SmFeLa oxide obtained in Production Example 1 was put in a steel container to a thickness of 10 mm. The container was placed in a furnace, and the pressure was reduced to 100 Pa. Then, while introducing hydrogen gas, the temperature was increased to a pretreatment temperature of 850° C. and maintained for 15 hours. The oxygen concentration was measured by a non-dispersive infrared (ND-IR) analysis (EMGA-820 available from Horiba Ltd.) and found to be 5% by mass. The results show that a black partial oxide was obtained in which the oxygen bonded to Sm remained unreduced while 95% of the oxygen bonded to Fe was reduced.

Reduction Step

An amount of 60 g of the partial oxide obtained in the pretreatment step was mixed with 19.2 g of metallic calcium having an average particle size of about 6 mm, and the mixture was placed in a furnace. After vacuum evacuation of the furnace, argon gas (Ar gas) was introduced. The temperature was increased to a first temperature of 1,045° C. and maintained for 45 minutes, and then the temperature was lowered to a second temperature of 1,000° C. and maintained for 30 minutes to obtain SmFeLa alloy particles.

Nitridation Step

Subsequently, the temperature inside the furnace was lowered to 100° C., followed by vacuum evacuation. Then, while introducing nitrogen gas, the temperature was increased to a first temperature of 430° C. and maintained for 3 hours. Next, the temperature was increased to a second temperature of 500° C. and maintained for 1 hour, followed by cooling to obtain a magnetic particle-containing bulk product.

Post Treatment Step

The bulk product obtained in the nitridation step was introduced into 3 kg of pure water and stirred for 30 minutes. After standing still, the supernatant was drained by decantation. The introduction into pure water, stirring, and decantation were repeated 10 times. Next, 2.5 g of 99.9% acetic acid was introduced and stirred for 15 minutes. After standing still, the supernatant was drained by decantation. The introduction into pure water, stirring, and decantation were repeated twice, followed by solid-liquid separation and then vacuum drying at 80° C. for 3 hours to obtain a SmFeN-based anisotropic magnetic powder.

Production Example 2

Precipitation Step

An amount of 5.0 kg of $FeSO_4.7H_2O$ was mixed and dissolved in 2.0 kg of pure water. To the mixture were further added 0.49 kg of $Sm_2O_3$, 0.035 kg of $La_2O_3$, and 0.74 kg of 70% sulfuric acid, and they were well stirred and completely dissolved. Next, pure water was added to the resulting solution so that the final Fe and Sm concentrations were adjusted to 0.726 mol/L and 0.112 mol/L, respectively, to obtain a SmFeLa sulfuric acid solution.

The entire amount of the SmFeLa sulfuric acid solution and 0.14 kg of 18% ammonium tungstate were added dropwise to 20 kg of pure water kept at a temperature of 40° C. with stirring over 70 minutes from the start of the reaction, while simultaneously adding dropwise a 15% ammonia solution to adjust the pH to 7 to 8. Thus, a slurry containing a SmFeLa hydroxide was obtained. The slurry was washed with pure water by decantation, followed by solid-liquid separation to separate the hydroxide. The separated hydroxide was dried in an oven at 100° C. for 10 hours.

Oxidation Step

The hydroxide obtained in the precipitation step was calcined in the air at 1,000° C. for 1 hour. After cooling, a red SmFeLaW oxide as raw material powder was obtained.

The pretreatment to post treatment steps were performed as described in Production Example 1 to obtain a SmFeN-based anisotropic magnetic powder.

Example 1

Dispersion Step

The SmFeN-based anisotropic magnetic powder prepared in Production Example 1 and media (nylon-coated iron core media, diameter: 10 mm, Vickers number of nylon coating: 7, specific gravity: 7.48, thickness of nylon layer: about 1 to 3 mm) were put into a container used in a vibration mill so that the amounts of the SmFeN-based anisotropic magnetic powder and the media were 5% by volume and 60% by volume, respectively, relative to the volume of the container. The powder was dispersed by the vibration mill in a nitrogen atmosphere for 30 minutes to obtain a SmFeN-based anisotropic magnetic powder. The average particle size, particle size distribution, residual magnetization σr, coercive force iHc, squareness ratio Hk, oxygen concentration, and nitrogen concentration of the SmFeN-based anisotropic magnetic powder were measured as described above, and the results are shown in Table 1. The metal contents of the powder were measured, and the results are shown in Table 2. Moreover, an image of the powder was taken with a scanning electron microscope (SU3500, Hitachi High-Technologies Corporation, 5 KV, 5,000×), and the results are shown in FIG. 1.

Modifier Powder Mixing Step

A metallic zinc powder was provided as a modifier powder. The D50 of the metallic zinc powder was 0.5 μm. Moreover, the purity of the metallic zinc powder was 99.9% by mass.

The dispersed SmFeN-based anisotropic magnetic powder was mixed with the modifier powder to obtain a powder mixture. The amount of the mixed metallic zinc relative to the amount of the powder mixture was 5% by mass.

Magnetic Field Compaction Step

The powder mixture was compacted in a magnetic field to obtain a magnetic field compact. The pressure of compaction was 50 MPa. The magnetic field applied was 1,600 kA/m.

Pressure Sintering Step

The magnetic field compact was pressure-sintered to obtain a sintered compact. The pressure sintering conditions included a sintering temperature of 400° C., an applied pressure of 1,500 MPa, and an application duration of 5 minutes.

Heat Treatment Step

The sintered compact was heat treated to obtain a SmFeN-based rare earth magnet of Example 1. The heat treatment conditions included a vacuum atmosphere, a heat treatment temperature of 380° C., and a heat treatment duration of 24 hours.

Example 2

Dispersion Step

Figure 2:
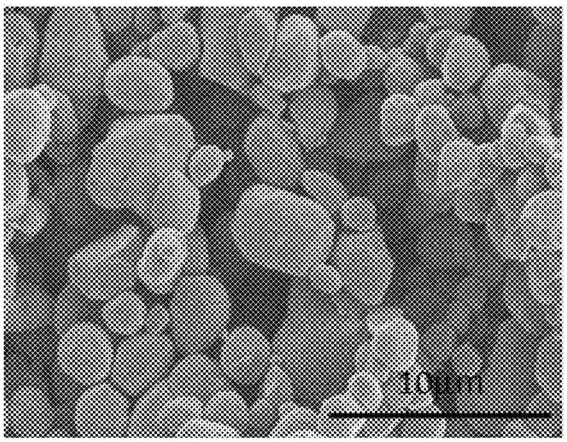
FIG. 2 shows an exemplary SEM image of a SmFeN-based anisotropic magnetic powder in Example 2.

The SmFeN-based anisotropic magnetic powder prepared in Production Example 2 and media (nylon-coated iron core media, diameter: 10 mm, Vickers number of nylon coating: 7, specific gravity: 7.48, thickness of nylon layer: about 1 to 3 mm) were put into a container used in a vibration mill so that the amounts of the SmFeN-based anisotropic magnetic powder and the media were 5% by volume and 60% by volume, respectively, relative to the volume of the container. The powder was dispersed by the vibration mill in a nitrogen atmosphere for 30 minutes to obtain a SmFeN-based anisotropic magnetic powder. The average particle size, particle size distribution, residual magnetization σr, coercive force iHc, squareness ratio Hk, oxygen concentration, and nitrogen concentration of the SmFeN-based anisotropic magnetic powder were measured as described above, and the results are shown in Table 1. The metal contents of the powder were measured, and the results are shown in Table 2. Moreover, an image of the powder was taken with a scanning electron microscope (SU3500, Hitachi High-Technologies Corporation, 5 KV, 5,000×), and the results are shown in FIG. 2.

The dispersed SmFeN-based anisotropic magnetic power was processed as in Example 1 to obtain a SmFeN-based rare earth magnet of Example 2.

Comparative Example 1

Figure 3:
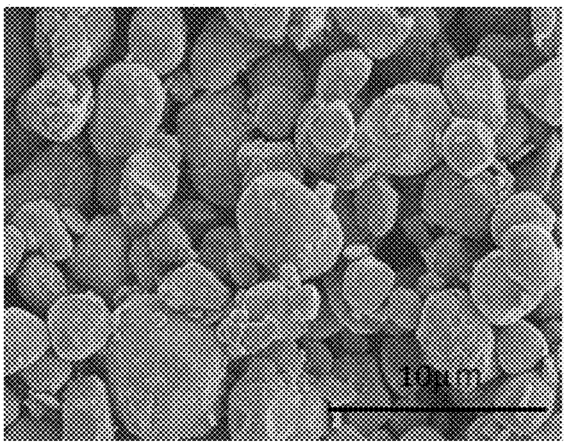
FIG. 3 shows an exemplary SEM image of a SmFeN-based anisotropic magnetic powder in Comparative Example 1.

The SmFeN-based anisotropic magnetic powder prepared in Production Example 1 and media (chromium steel balls, SUJ2, diameter: 2.3 mm, Vickers number: 760, specific gravity: 7.77) were put into a container used in a vibration mill so that the amounts of the SmFeN-based anisotropic magnetic powder and the media were 5% by volume and 60% by volume, respectively, relative to the volume of the container. The powder was dispersed by the vibration mill in a nitrogen atmosphere for 60 minutes to obtain a SmFeN-based anisotropic magnetic powder. The average particle size, particle size distribution, residual magnetization σr, coercive force iHc, squareness ratio Hk, oxygen concentration, and nitrogen concentration of the SmFeN-based anisotropic magnetic powder were measured as described above, and the results are shown in Table 1. The metal contents of the powder were measured, and the results are shown in Table 2. Moreover, an image of the powder was taken with a scanning electron microscope (SU3500, Hitachi High-Technologies Corporation, 5 KV, 5,000×), and the results are shown in FIG. 3.

The dispersed SmFeN-based anisotropic magnetic power was processed as in Example 1 to obtain a SmFeN-based rare earth magnet of Comparative Example 1.

Comparative Example 2

Figure 4:
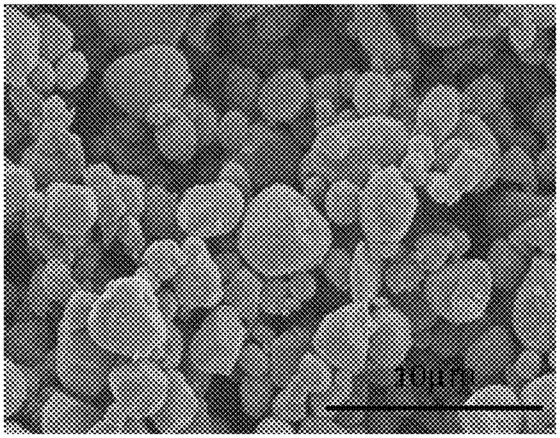
FIG. 4 shows an exemplary SEM image of a SmFeN-based anisotropic magnetic powder in Comparative Example 2.

The SmFeN-based anisotropic magnetic powder prepared in Production Example 2 and media (chromium steel balls, SUJ2, diameter: 2.3 mm, Vickers number: 760, specific gravity: 7.77) were put into a container used in a vibration mill so that the amounts of the SmFeN-based anisotropic magnetic powder and the media were 5% by volume and 60% by volume, respectively, relative to the volume of the container. The powder was dispersed by the vibration mill in a nitrogen atmosphere for 60 minutes to obtain a SmFeN-based anisotropic magnetic powder. The average particle size, particle size distribution, residual magnetization σr, coercive force iHc, squareness ratio Hk, oxygen concentration, and nitrogen concentration of the SmFeN-based anisotropic magnetic powder were measured as described above, and the results are shown in Table 1. The metal contents of the powder were measured, and the results are shown in Table 2. Moreover, an image of the powder was taken with a scanning electron microscope (SU3500, Hitachi High-Technologies Corporation, 5 KV, 5,000×), and the results are shown in FIG. 4.

The dispersed SmFeN-based anisotropic magnetic power was processed as in Example 1 to obtain a SmFeN-based rare earth magnet of Comparative Example 2.

TABLE 1

| Example No. | Particle size (μm) | D10 (μm) | D50 (μm) | D90 (μm) | Span | Circ (circularity) | σr (emu/g) | iHc (Oe) | Hk (Oe) | O concentration (%) | N concentration (%) |
|---|---|---|---|---|---|---|---|---|---|---|---|
| Example 1 | 3.93 | 2.05 | 3.77 | 5.94 | 1.03 | 0.813 | 153.8 | 7865 | 3428 | 0.21 | 3.34 |
| Example 2 | 3.10 | 1.58 | 2.90 | 4.78 | 1.10 | 0.828 | 152.2 | 10570 | 4751 | 0.37 | 3.39 |
| Comparative Example 1 | 3.58 | 1.81 | 3.48 | 5.51 | 1.06 | 0.808 | 148.3 | 7980 | 3027 | 0.33 | 3.33 |
| Comparative Example 2 | 2.79 | 1.40 | 2.69 | 4.26 | 1.06 | 0.830 | 148.9 | 11750 | 5431 | 0.46 | 3.40 |

TABLE 2

| | Content (%) | | | | | Composition | | | | |
|---|---|---|---|---|---|---|---|---|---|---|
| Example No. | Sm | Fe | N | La | W | Sm | Fe | N | La | W |
| Example 1 | 22.7 | 74.0 | 3.34 | 0.30 | | 8.8 | 77.2 | 13.9 | 0.1 | |
| Example 2 | 23.0 | 72.8 | 3.39 | 0.35 | 0.52 | 9.0 | 76.5 | 14.2 | 0.1 | 0.2 |
| Comparative Example 1 | 23.7 | 73.0 | 3.33 | 0.47 | | 9.2 | 76.6 | 13.9 | 0.2 | |
| Comparative Example 2 | 22.7 | 75.8 | 3.40 | 0.31 | 0.42 | 8.6 | 77.3 | 13.8 | 0.1 | 0.1 |

The magnetic properties of the SmFeN-based rare earth magnets obtained in Example 1, Example 2, Comparative Example 1, and Comparative Example 2 were measured. The measurement of the magnetic properties was carried out at room temperature using a vibrating sample magnetometer (VSM). The results are shown in Table 3.

TABLE 3

| Example No. | Residual magnetization (T) | Coercive force (kA/m) |
|---|---|---|
| Example 1 | 1.03 | 2241 |
| Example 2 | 1.01 | 2310 |
| Comparative Example 1 | 0.96 | 2202 |
| Comparative Example 2 | 0.95 | 2295 |

As demonstrated in Table 3, the SmFeN-based rare earth magnets of Examples 1 and 2 in which the powders were dispersed using a nylon resin-coated iron core as the media had a higher residual magnetization than those of Comparative Examples 1 and 2 in which the powders were dispersed using chromium steel balls not coated with a resin as the media.

What is claimed is:

1. A method of producing a SmFeN-based rare earth magnet, the method comprising:

dispersing a SmFeN-based anisotropic magnetic powder comprising Sm, Fe, and N using a resin-coated metal media or a resin-coated ceramic media in a vibration mill or a ball mill to obtain a dispersed SmFeN-based anisotropic magnetic powder by removing the resin-coated metal media or the resin-coated ceramic media;

mixing the dispersed SmFeN-based anisotropic magnetic powder with a modifier powder to obtain a powder mixture;

compacting the powder mixture in a magnetic field to obtain a magnetic field compact;

pressure-sintering the magnetic field compact to obtain a sintered compact; and heat treating the sintered compact, wherein a diameter of the resin-coated metal media or the resin-coated ceramic media is at least 2 mm but not more than 100 mm.

2. The method of producing a SmFeN-based rare earth magnet according to claim 1, wherein the dispersed SmFeN-based anisotropic magnetic powder has an average particle size of at least 2.5 μm but not more than 5 μm, a residual magnetization σr of not less than 150 emu/g, and an oxygen content of not higher than 0.4% by mass.

3. The method of producing a SmFeN-based rare earth magnet according to claim 1, wherein the dispersed SmFeN-based anisotropic magnetic powder has a particle size D50 corresponding to 50th percentile of the cumulative particle size distribution by volume of the SmFeN-based anisotropic magnetic powder of at least 2 μm but not more than 5 μm, a residual magnetization σr of not less than 150 emu/g, and an oxygen content of not higher than 0.4% by mass.

4. The method of producing a SmFeN-based rare earth magnet according to claim 1, wherein the resin-coated metal media is a nylon resin-coated iron core media.

5. The method of producing a SmFeN-based rare earth magnet according to claim 1, wherein the modifier powder is a metallic zinc powder.

6. The method of producing a SmFeN-based rare earth magnet according to claim 1, wherein, in the mixing the dispersed SmFeN-based anisotropic magnetic powder with the modifier powder, an amount of the modifier powder relative to an amount of the dispersed SmFeN-based anisotropic magnetic powder is not more than 15% by mass.

7. The method of producing a SmFeN-based rare earth magnet according to claim 1, wherein, in the mixing the dispersed SmFeN-based anisotropic magnetic powder with the modifier powder, an amount of the modifier powder relative to an amount of the dispersed SmFeN-based anisotropic magnetic powder is not less than 1% by mass.

8. The method of producing a SmFeN-based rare earth magnet according to claim 1, wherein, in the pressure-sintering the magnetic field compact to obtain the sintered compact, the magnetic field compact is pressure-sintered at a temperature not lower than 310° C.

9. The method of producing a SmFeN-based rare earth magnet according to claim 1, wherein, in the pressure-sintering the magnetic field compact to obtain the sintered compact, the magnetic field compact is pressure-sintered at a temperature not higher than 400° C.

10. The method of producing a SmFeN-based rare earth magnet according to claim 1, wherein the modifier powder comprises zinc, a zinc alloy, or a combination thereof.

* * * * *